United States Patent [19]

Hirose

[11] Patent Number: 5,308,244
[45] Date of Patent: May 3, 1994

[54] LEARNING DEVICE
[75] Inventor: Atsushi Hirose, Sanda, Japan
[73] Assignee: Matsushita Electric Industrial Co. Ltd., Osaka, Japan
[21] Appl. No.: 909,314
[22] Filed: Jul. 6, 1992
[30] Foreign Application Priority Data
  Jul. 4, 1991 [JP] Japan .................................. 3-164321
[51] Int. Cl.⁵ .............................................. G09B 5/00
[52] U.S. Cl. .................................... 434/169; 434/118; 434/307; 434/365; 364/419.1; 364/419.19; 395/144; 395/927
[58] Field of Search ............... 395/400, 144, 152, 927; 434/157, 118, 169, 176, 185, 201, 307, 308, 323, 362, 365; 364/419, 419.01, 419.02, 419.10, 419.11, 419.19; 345/11, 156, 185

[56] References Cited
U.S. PATENT DOCUMENTS

| | | | |
|---|---|---|---|
| 4,783,761 | 11/1988 | Gray et al. | 364/419 |
| 4,860,206 | 8/1989 | Kugimiya et al. | 434/157 X |
| 4,968,257 | 11/1990 | Yalen | 434/169 X |
| 5,043,712 | 8/1991 | Kihara et al. | 434/157 X |
| 5,113,340 | 5/1992 | McWherter | 434/169 X |
| 5,180,307 | 1/1993 | Hiramatsu | 434/185 X |
| 5,181,162 | 1/1993 | Smith et al. | 364/419 |

Primary Examiner—Richard J. Apley
Assistant Examiner—Joe H. Cheng
Attorney, Agent, or Firm—Ratner & Prestia

[57] ABSTRACT

A learning device is provided with an information processing unit, a keyboard for inputting characters, an information storage medium for storing a variety of data, a CRT display for displaying characters and/or figures, and a mouse for designating a specific location on the CRT display. The information storage medium stores a plurality of learning materials of which respective learning items has a tree structure. The information storage medium also stores the tree structure of the learning items, the name of each learning item, the names of learning items positioned at next upper and next lower levels in the tree structure, and the name of a learning material corresponding to each learning item. A learner can instruct the CRT display to display a portion or all the tree structure using either the keyboard or the mouse. Also, the learner can alter the display range according to his intention. When one of the learning items displayed on the CRT display is designated by the mouse, the name of the corresponding learning material is initially read and a learning material having the read name is then called.

19 Claims, 5 Drawing Sheets

LEARNING DEVICE

BACKGROUND OF THE INVENTION

1. Field of the Invention

The present invention relates to an education or learning device utilizing a computer, the device being generally referred to as CAI (Computer Aided Instruction).

2. Description of the Prior Art

In recent years, with a rapid growth of computer and related technologies, there has been put into practice an education or learning device utilizing a computer referred to as CAI. Above all, the most popular one is the system referred to as normal-frame type CAI utilizing a personal computer or the like.

The following describes an exemplified frame type CAI device utilizing a conventional personal computer with reference to the attached drawings.

FIG. 1 schematically shows a frame type CAI device utilizing a conventional personal computer. The device shown in FIG. 1 comprises a personal computer unit 301, an input unit 302 such as a keyboard or a mouse, a display unit 303 such as a CRT display, and a data storage unit 304 such as a floppy disk or a hard disk. A learning material 305 is stored as data in the data storage unit 304 and generally includes a plurality of learning means. The learning material 305 has a frame 306 generally comprising a presentation means for presenting an explanation screen, a question presentation/answer evaluation means and the like, and a lesson structure 307 for defining procedures required for presenting the frame 306 to a learner (e.g., refer to pages 143 through 177 of "CAI handbook").

The frame type CAI device having the above-mentioned construction operates as follows.

When a learner gives an instruction to the personal computer unit 301 by means of the input unit 302, the leaning material 305 stored in the data storage unit 304 is called to display an explanation screen and a question on the display unit 303. The learner reads and learns the explanation screen and answers each question by means of the input unit 302. Procedures of presenting the frame is predetermined in the lesson structure 307 as shown in FIG. 2 by the producer of the learning material to allow the learner to advance learning.

In the above-mentioned construction, however, the learner has to obey in any case the learning items and procedures predetermined by the producer of the leaning material. Such a device is disadvantageous in that each learner cannot change the learning contents and procedures in compliance with his own purpose, knowledge, and circumstances.

SUMMARY OF THE INVENTION

The present invention has been developed to overcome the above-described disadvantage.

It is accordingly an object of the present invention to provide an improved leaning device capable of allowing a learner to select and determine learning items and order according to his circumstances.

In accomplishing this and other objects, a learning device according to the present invention comprises an information processing unit, a character input means for inputting characters, an information storage means for storing a variety of data, and a character/figure display means for displaying characters and/or figures. The learning device according to the present invention further comprises a location designation means, a learning material storage means, a tree structure storage means, a display instruction means, a tree structure display range alteration means, and a learning material calling means. A specific location on the character/figure display means can be designated by the use of the location designation means. The learning material storage means is provided for storing a plurality of learning materials of which respective learning items has a tree structure. The tree structure storage means is provided for storing the tree structure of the learning items, a name of each learning item, names of learning items positioned at next upper and next lower levels in the tree structure, and a name of a learning material corresponding to each learning item. The display instruction means is provided for instructing the character/figure display means to display at least a portion of the tree structure in response to at least one of a first character input by the character input means and a first location designation by the location designation means. The tree structure display range alteration means alters the range of the tree structure displayed on the character/figure display means in response to at least one of a second character input by the character input means and a second location designation by the location designation means. When one of the learning items displayed on the character/figure display means is designated by the location designation means, the learning material calling means reads the name of the corresponding learning material from the tree structure storage means and calls a learning material having the read name from the learning material storage means.

Conveniently, the learning device further comprises an image display means for displaying images or a sound reproduction means for reproducing and outputting sounds.

In the learning device having the above-mentioned construction, when a learner designates one of the learning items displayed on the character/figure display means by the use of either he character input means or the location designation means, the contents of the tree structure storage means are initially referred to. Thereafter, a learning material name corresponding to the designated learning item is read from the tree structure storage means, and subsequently, an appropriate learning material is called from the learning material storage means.

BRIEF DESCRIPTION OF THE DRAWINGS

The above and other objects and features of the present invention will become apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
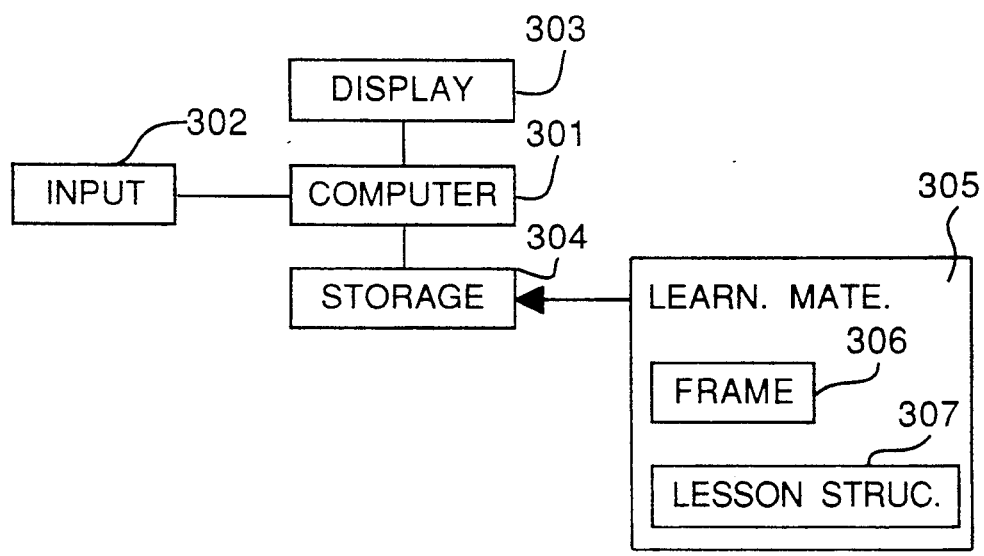
FIG. 1 is a block diagram of a frame type CAI device utilizing a conventional personal computer.
Figure 2:
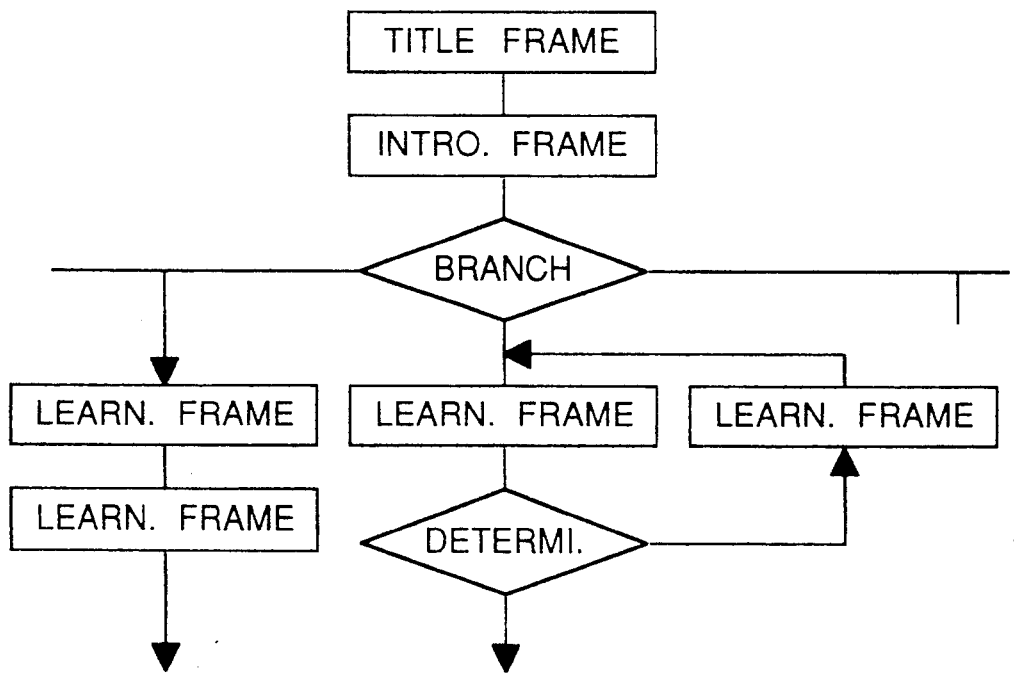
FIG. 2 is a schematic view indicative of a lesson structure incorporated in the device of FIG. 1.
Figure 3:
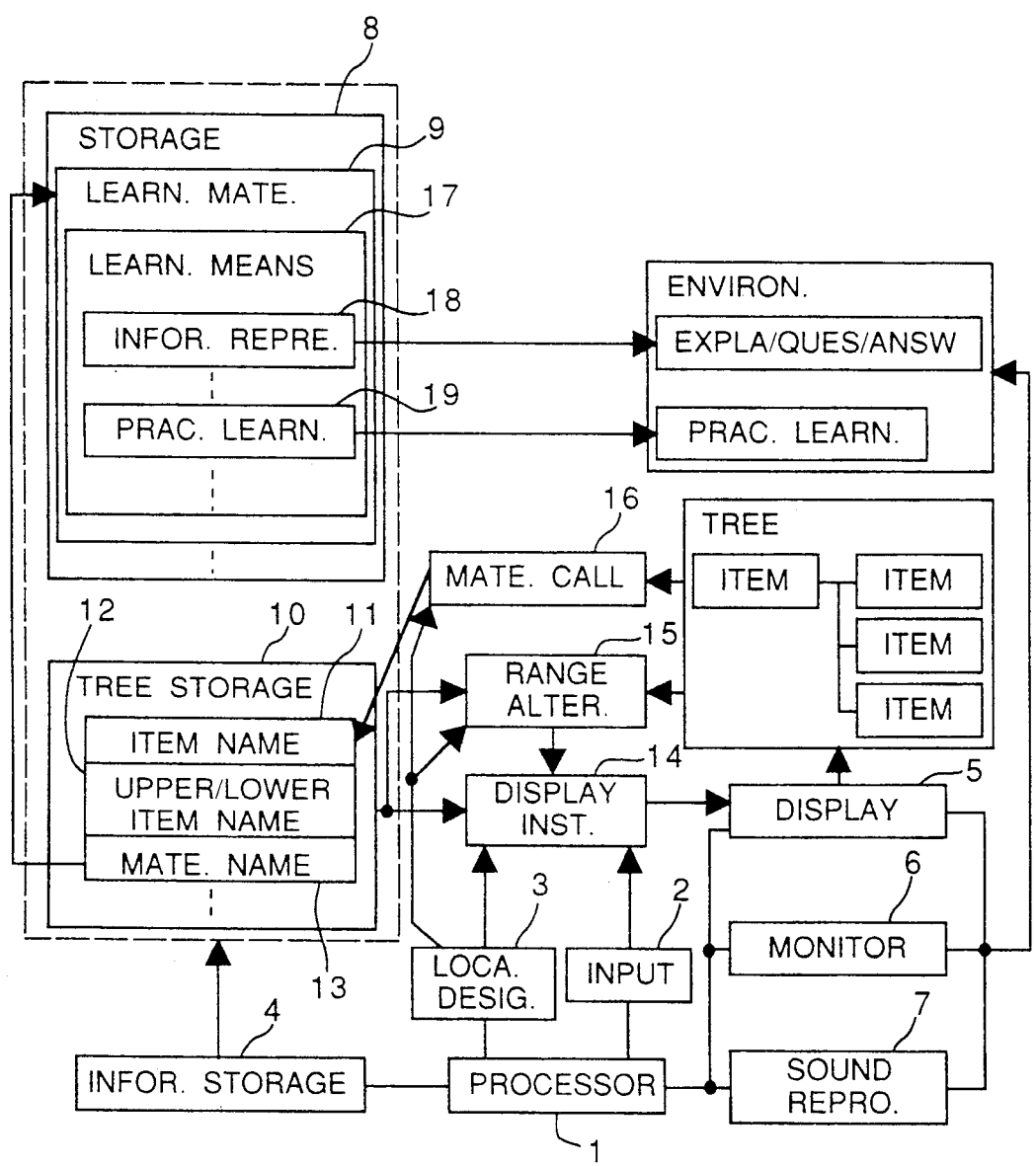
FIG. 3 is a block diagram of a learning device according to a first embodiment of the present invention.

FIG. 3 schematically depicts a learning device embodying the present invention. As depicted in FIG. 1, the learning device comprises an information processing unit 1 such as a work station, a character input means 2 for inputting characters, a location designation means 3 for designating a specific location on a display, an information storage means 4 for storing a variety of data such as, for example, programs, numerals, symbols, characters, figures, images, sounds or the like, a character/figure display means 5 for displaying characters and/or figures, an image display means 6 for displaying images, and a sound reproduction means 7 for reproducing and outputting sounds. A keyboard and a mouse are preferably employed as the character input means 2 and the location designation means 3, respectively. A magnetic disk, an optical disk or the like is preferably employed as the data storage means 4. A CRT display and a TV monitor are preferably employed as the character/figure display means 5 and the image display means 6, respectively. A loudspeaker is preferably employed as the sound reproducing means 7.

The learning device further comprises a learning material storage means 8 for storing a plurality of learning materials 9 of which respective learning items take the form of a tree structure and a tree structure storage means 10 for storing the tree structure of a plurality of learning items indicative of respective learning materials 9. The tree structure storage means 10 also stores a name 11 of each learning item, names 12 of learning items positioned at next upper and next lower levels in the tree structure, and a name 13 of a learning material corresponding thereto. The learning device also comprises a display instruction means 14, a tree structure display range alteration means 15, and a learning material calling means 16. In response to a character input by the character input means 2 or a location designation by the location designation means 3, the display instruction means 14 instructs the character/figure display means 5 to display a restricted range of the tree structure covering only a specified learning item and one or more learning items positioned at the next lower level of the specified learning item, with reference to the learning item names 11 and respective upper and lower learning item names 12 stored in the tree structure storage means 10. The tree structure display range alteration means 15 operates, when one of the learning items on display is designated by the location designation means 3, to alter the display range of the tree structure of the learning items with reference to data stored in the tree structure storage means 10. The learning material calling means 16 operates, when one of the learning items on display is designated by the location designation means 3, to read the learning material name 13 corresponding to the designated learning item from the tree structure storage means 10 and calls the learning material 9 having the learning material name 13 from the learning material storage means 8 to put the same into operation. The learning material 9 of each learning item is provided with a learning means 17, which comprises at least one of an information representation means 18 and a practical learning means 19.

The operations of the learning device having the above-mentioned construction is discussed hereinafter with reference to FIGS. 3 and 4.

Firstly, when a learner performs a character input or location designation operation by the use of the character input means 2 or the location designation means 3, the display instruction means 14 reads each learning item name 11 and its upper and lower item names 12 from the tree structure storage means 10 and causes the character/figure display means 5 to display a portion or all of the tree structure of the learning items. When the learner designates one of the learning items on display by the use of the location designation means 3, the tree structure display range alteration means 15 reads the designated learning item name 11 and its upper and lower item names 12 from the tree structure storage means 10 to alter the display range. When the next lower item or items of the designated learning item exist and are not displayed, the display range is altered to the designated item and the lower items. When the next upper item of the designated learning item exists and is not displayed, the display range is altered to cover the next upper item and the designated item along with all the other items positioned at the same level as the designated item. When an upper item of a learning item designated by another designation means exists and is not displayed, the display range is altered to the highest item and its next lower items. A specific button which is not ordinarily used is serviceable as said another designation means and may be provided on the location designation means 3. The above-mentioned display range alteration operation is detailed hereinafter with reference to FIGS. 4a through 4e.

Figure 4A:
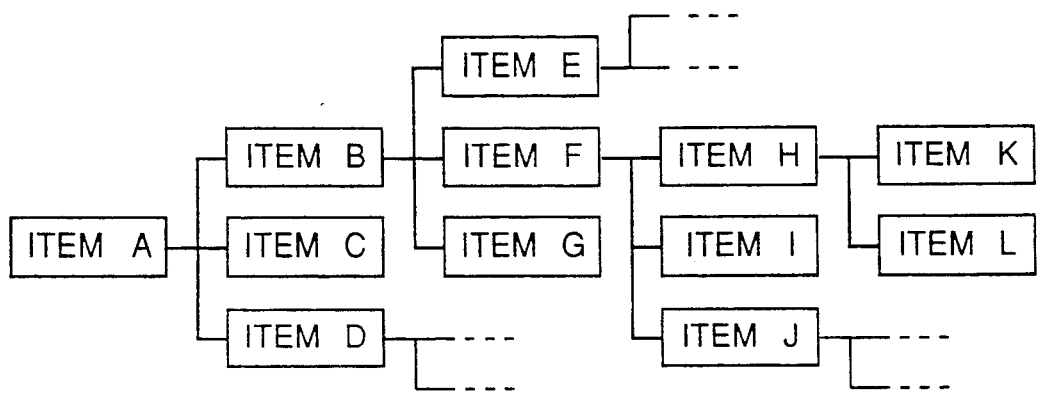
FIGS. 4a, 4b, 4c, 4d, and 4e are schematic views indicative of operations of a tree structure display range alteration means of the first embodiment.
Figure 4B:
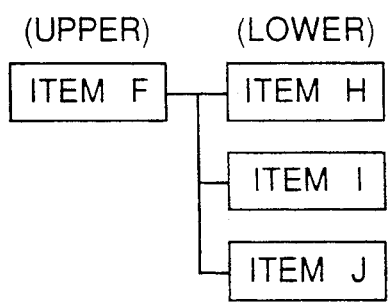
Figure 4C:
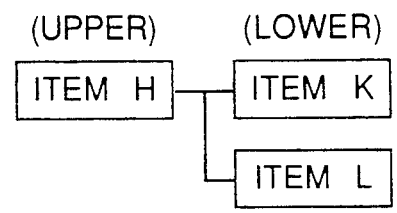
Figure 4D:
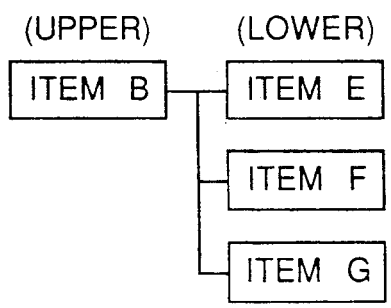
Figure 4E:
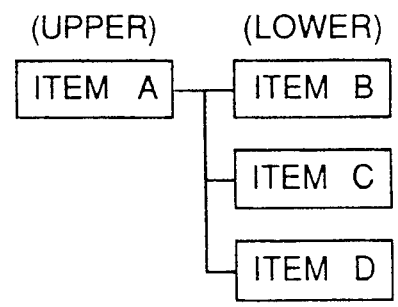

It is now supposed that a portion of a plurality of learning items having a tree structure as shown in FIG. 4a is displayed as shown in FIG. 4b. When a learner designates "Item H" from among the lower items by the use of the location designation means 3, the tree structure display range alteration means 15 reads the upper and lower learning item names 12 of the designated learning item from the tree structure storage means 10 to set up a new display range with the "Item H" being the upper item. As a result, the display instruction means 14 causes the character/figure display means 5 to display the designated "Item H" and its next lower items as shown in FIG. 4c. When "Item F" is designated by the location designation means 3 on the display condition as shown in FIG. 4b, the display range is altered as shown in FIG. 4d. When "Item B" is subsequently designated by the location designation means 3, the display image is further altered as shown in FIG. 4e. When the "Item F" is designated by another designation means on the display condition as shown in FIG. 4b, the highest item is retrieved and a display screen as shown in FIG. 4e appears. It is noted that, when one of the lowest items, "Item K" and "Item L", is designated on a display condition as shown in FIG. 4c or when the highest item "Item A" is designated on the display condition as shown in FIG. 4e, the display range is not altered. By using the functions as described above, the learner can retrieve any upper or lower item in a simplified manner irrespective of the size of the tree structure of the learning items.

When one of the learning items on display is designated by means of a button which is provided on the location designation means 3 and is not assigned to item retrieval, the learning material calling means 16 reads a learning material name 13 corresponding to the designated learning item 11 from the tree structure storage means 10, and then calls a learning material 9 corresponding to the learning material name 13 from the learning material storage means 8. At this moment, the information representation means 18 and the practical learning means 19 of the learning means 17 of the learning material 9 provide two kinds of learning environments of explanation/question/answer and practical learning environment by means of the character/figure display means 5, the image display means 6, and the sound reproduction means 7.

According to the present embodiment as described above, the display range of the tree structure of the learning items is limited to a certain learning item and its next lower items. Furthermore, all such functions as the alteration of the display range to upper or lower items and the call of an intended learning material can be achieved simply by designating one of the learning items on display with the use of a mouse or the like, thereby facilitating learning item retrieval and learning material calling. Specifically, the learning item retrieval can be reliably effected irrespective of the size of the tree structure of the learning items.

It is to be noted here that, in the above-described embodiment, although the display range of the tree structure of the learning items limitedly covers a certain learning item and its next lower items, the display range may cover one learning item and a plurality of learning items falling within a predetermined number of lower levels immediately below said one learning item. In this case, when one of the learning items displayed on the character/figure display means is designated by the location designation means 3, the tree structure display range alteration means repeats retrieval of a plurality of learning items falling within a predetermined number of lower levels immediately below the designated learning item. As a result of the retrieval, when the presence of a learning item or items being not displayed is discovered, the range to be displayed on said character/figure display means is altered to cover the designated learning item and the plurality of learning items falling within the predetermined number of lower levels. If a learning item having a level next upper than the level of the designated learning item exists and is not displayed, the range to be displayed on the character/figure display means is altered to cover the learning item having the next upper level and a plurality of learning items falling within the predetermined number of lower levels.

Furthermore, when one of the learning items displayed on the character/figure display means is designated by another designation means, the range to be displayed on the character/figure display means is altered to cover a learning item having a highest level and a plurality of learning items falling within the predetermined number of lower levels immediately below the highest learning item.

Figure 5:
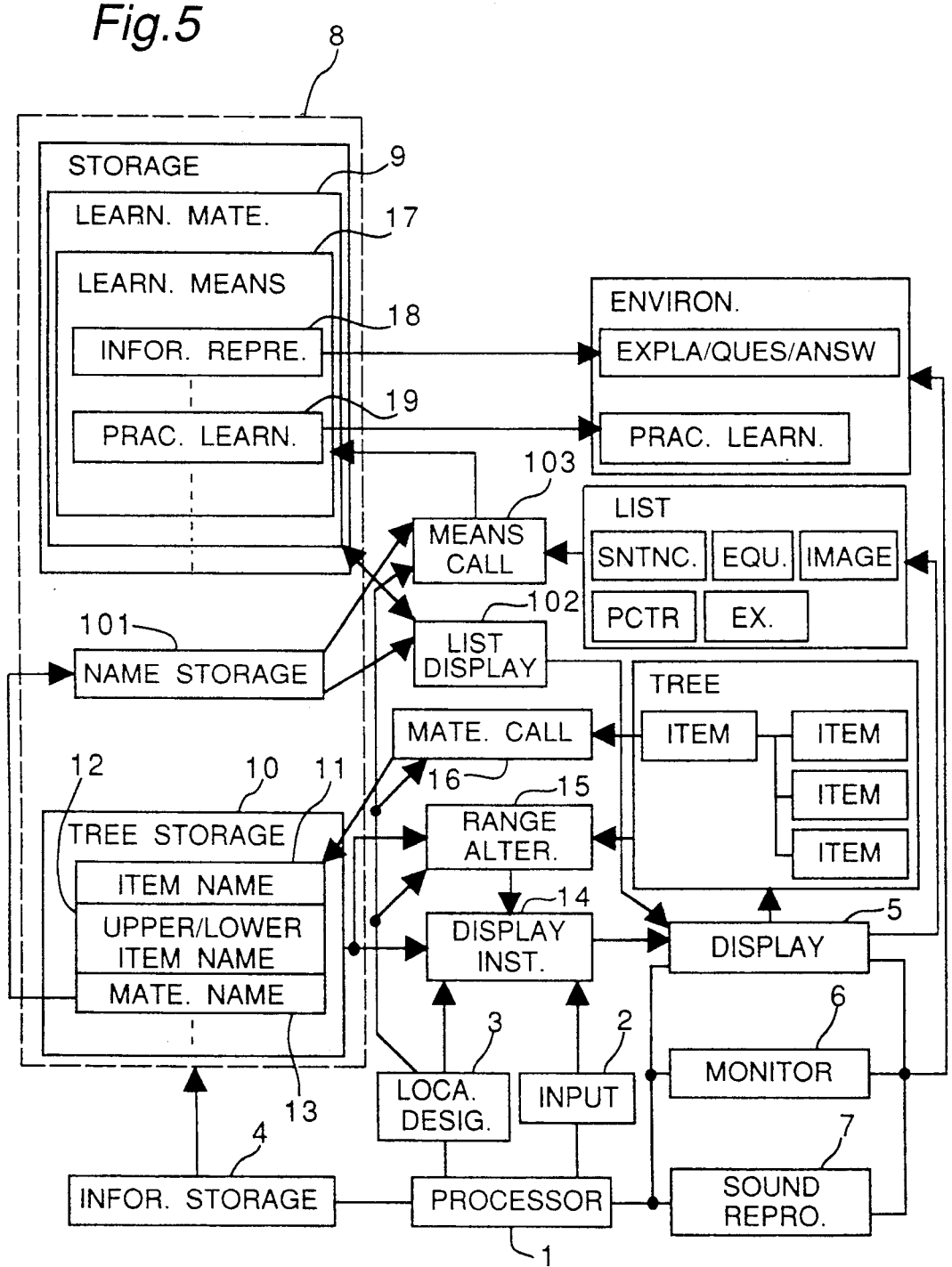
FIG. 5 is a diagram similar to FIG. 3, but according to a second embodiment of the present invention.

FIG. 5 schematically depicts a learning device according to a second embodiment of the present invention. The learning device of FIG. 5 comprises an information processing unit 1, a character input means 2, a location designation means 3, an information storage means 4, a character/figure display means 5, an image display means 6, and a sound reproduction means 7. A learning material storage means 8 stores a plurality of learning materials 9 corresponding to respective learning items having a tree structure. A tree structure storage means 10 stores for each learning item a learning item name 11, upper and lower item names 12, and corresponding learning material names 13. A display instruction means 14 reads character input by the character input means 2 or location designation by the location designation means 3 and causes the character/figure display means 5 to display a restricted range of the tree structure covering only a specified learning item and one or more learning items positioned at the next lower level of the specified learning item, with reference to the learning item names 11 and respective upper and lower item names 12 stored in the tree structure storage means 10. A tree structure display range alteration means 15 operates, when one of the learning items on display is designated by the location designation means 3, to alter the display range of the tree structure with reference to the data stored in the tree structure storage means 10.

The above-mentioned construction is the same as that of the first embodiment shown in FIG. 3. What is different from the first embodiment is that the learning material 9 corresponding to each learning item is provided with one or a plurality of learning means 17 having different explanation methods and styles. The second embodiment shown in FIG. 5 also differs from the first embodiment in that the former comprises a called material name storage means 101, a list display instruction means 102, and a learning means calling means 103. The called material name storage means 101 stores "a learning material name 13 corresponding to the designated learning item" which is called from the tree structure storage means 10 by the learning material calling means 16. The list display instruction means 102 retrieves the learning means 17 of a learning material 9 having the called material name 13 and causes the character/figure display means 5 to display a name list of the learning means 17. The learning means calling means 103 calls a learning means having the learning means name designated by the location designation means 3 by retrieving the learning material having the learning material name stored in the called material name storage means 101.

It is to be noted that each learning means 17 is provided with at least one of an information representation means 18 and a practical learning means 19, as similar to the first embodiment.

The following describes only the difference in operation between the learning device constructed as above and the first embodiment. When a learner designates one of the learning items on display by means of the location designation means 3, the learning material calling means 16 reads the learning material name 13 corresponding to the designated learning item from the tree structure storage means 10 and stores the name in the called material name storage means 101. Then, the list display instruction means 102 reads the called learning material name from the called material name storage means 101 and retrieves the learning means name stored in the corresponding learning material 9 to display the name list on the character/figure display means 5. When the learner designates one of the listed learning means names by the location designation means 3, the learning means calling means 103 retrieves and calls the learning means 17 corresponding to the designated learning means name from among the listed learning means of the learning material 9 having the learning material name stored in the called material name storage means 101.

Operations after the learning means has been called are the same as those in the first embodiment. More specifically, the information representation means 18 and the practical learning means 19 of each learning means 17 provide the learner with two kinds of learning environments of explanation/question/answer and practical learning environment by means of the character/figure display means 5, the image display means 6, and the sound reproduction means 7.

As described above, according to the second embodiment of the present invention, a learning material is provided with one or a plurality of learning means having different explanation methods and styles, and each learner can confirm a name list thereof to freely and easily select a desired learning means in accordance with his intention. As a result, each learner can advance learning with the learning means having the most appropriate style and explanation method for him.

Figure 6:
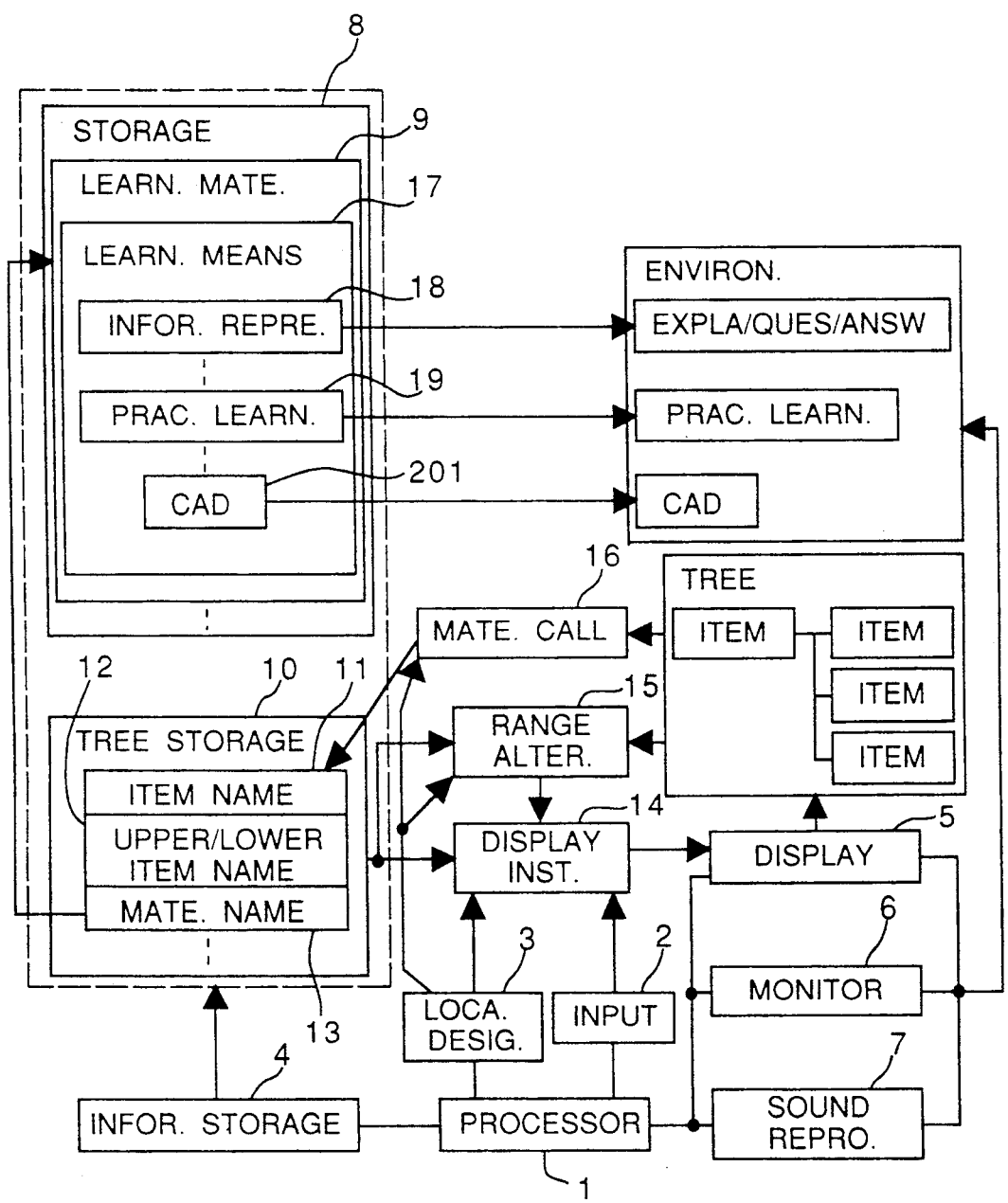
FIG. 6 is a diagram similar to FIG. 3, but according to a third embodiment of the present invention.

FIG. 6 schematically depicts a learning device according to a third embodiment of the present invention. The learning device of FIG. 6 comprises an information processing unit 1, a character input means 2, a location designation means 3, an information storage means 4, a character/figure display means 5, an image display means 6, and a sound reproduction means 7. A learning material storage means 8 stores a plurality of learning materials 9 corresponding to respective learning items having a tree structure. A tree structure storage means 10 stores for each learning item a learning item name 11, upper and lower item names 12, and corresponding learning material names 13. A display instruction means 14 reads character input by the character input means 2 or location designation by the location designation means 3 and causes the character/figure display means 5 to display a restricted range of the tree structure covering only a specified learning item and one or more learning items positioned at the next lower level of the specified learning item, with reference to the learning item names 11 and respective upper and lower item names 12 stored in the tree structure storage means 10. A tree structure display range alteration means 15 operates, when one of the learning items on display is designated by the location designation means 3, to alter the display range of the tree structure with reference to the data stored in the tree structure storage means 10. A learning material calling means 16 operates, when one of the learning items on display is designated by the location designation means 3, to read the learning material name 13 corresponding to the designated learning item from the tree structure storage means 10 and calls the learning material 9 having the learning material name 13 from the learning material storage means 8 to put the same into operation. The learning material 9 of each item is provided with one learning means 17 having at least one of an information representation means 18 and a practical learning means 19.

The above-mentioned construction is similar to that of the first embodiment shown in FIG. 3. What is different from the embodiment shown in FIG. 3 is that the learning means 17 is provided with a CAD practical learning means 201 as one of practical learning means. The CAD practical learning means 201 provides a learner with a CAD practical learning environment.

The difference between the learning device constructed as above and the first embodiment is as follows. When a learning material 9 is called in the same manner as in the first embodiment, the information representation means 18 and the practical learning means 19 of the learning material 9 provide the learner with two kinds of learning environments of explanation/question/answer and practical learning environment by the use of the character/figure display means 5, the image display means 6, and the sound reproduction means 7. At this moment, the CAD practical learning means 201 is put into operation as one of the practical learning means 19 to provide the learner with a CAD practical learning environment.

As mentioned above, by providing the learner with the learning environment integrating explanation/question/answer and a practical learning environment, the learner can learn CAD practice concurrently with referring to an explanation about CAD as well as checking and confirming the learned knowledge at his own pace, thereby solving the serious problem of separation between lecture and practice.

It is to be noted that the information processing unit 1 may be any device having an information processing function in place of the aforesaid general-use computer such as a work station or a personal computer. The image display means 6 and the sound reproduction means 7 are not always required. Also, the location designation means 3 may be any device capable of designating a desired location on a display screen. A combination of a tablet and a pen or a touch panel can be used as the location designation means 3 in place of a mouse.

In the third embodiment, the CAD practical learning means 201 may be replaced by any other practical learning means for a system necessitating elementary knowledge or training such as, for example, various analysis systems or document generators.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A learning device comprising:
   an information processing unit;
   a characteristic input means, operatively connected with said information processing unit, for inputting characters;
   an information storage means, operatively connected with said information processing unit, for storing a variety of data;
   a first visual information display means, operatively connected with said information processing unit, for displaying characters and figures;
   a location designation means, operatively connected with said information processing unit, for designating a specific location on said first visual information display means;
   a learning material storage means for storing a plurality of learning materials of which respective learning items has a tree structure;
   a tree structure storage mans for storing said tree structure of said learning items, a name of each learning item, names of learning items positioned at next upper and next lower levels in said tree structure, and a name of a learning material corresponding to said each learning item;
   a display instruction means for instructing said first visual information display means to display at least a portion of said tree structure with reference to information stored in said tree structure storage means in response to at least one of a first character input by said character input means and a first location designation by said location designation means;

a tree structure display range alteration means for altering a range of said tree structure displayed on said first visual information display means with reference to said information in response to at least one of a second character input by said character input means and a second location designation by said location designation means; and a learning material calling means for reading from said tree structure storage means a learning material name of one of said learning items displayed on said first visual information display means and calling a learning material having said learning material name from said learning material storage means, said one of said learning items being designated by said location designation means.

2. The learning device according to claim 1 further comprising a second visual information display means for displaying images.

3. The learning device according to claim 1 further comprising a sound reproduction means for reproducing and outputting sounds.

4. The learning device according to claim 1, wherein a learning material corresponding to each learning item has a single learning means which is used when said learning material is called.

5. The learning device according to claim 4, wherein said learning means comprises at least one of a data presentation means for presenting explanation, question, answer and a practical learning means for providing a practical learning environment.

6. The learning device according to claim 5, wherein said practical learning means comprises a CAD practical learning means.

7. The learning device according to claim 1,
wherein each of said learning materials has a plurality of learning means having different explanation methods and styles, said learning device further comprising a called material name storage means for storing a learning material name read from said tree structure storage means by said learning material calling means, a list display instruction means for retrieving said learning means of a learning material having said learning material name and instructing said first visual information display means to display a name list of said learning means, and a calling means for calling, when one of the names of said learning means displayed is designated by said location designation means, a specific learning means corresponding to said one of the names of said learning means from a learning material having said learning material name stored in said called material name storage means.

8. The learning device according to claim 7, wherein each of said learning means comprises at least one of a data presentation means for presenting explanation, question, answer and a practical learning means for providing a practical learning environment.

9. The learning device according to claim 8, wherein said practical learning means comprises a CAD practical learning means.

10. The learning device according to claim 1,
wherein said location designation means comprises a first designation means and a second designation means, wherein the range of said tree structure displayed on said first visual information display means limitedly covers one learning item and a plurality of learning items falling within a predetermined number of lower levels immediately below said one learning item, wherein when one of said learning items displayed on said first visual information display means is designated by said first designation means, said tree structure display range alteration means repeats retrieval of a plurality of learning items falling within a predetermined number of lower levels immediately below said designated learning item, wherein when the presence of a learning item being not displayed is discovered during said retrieval, the range to be displayed on said first visual information display means is altered to cover said designated learning item and said plurality of learning items falling within said predetermined number of lower levels, and wherein when a learning item having a level next upper than the level of said designated learning item exists and is not displayed, the range to be displayed on said first visual information display means is altered to cover said learning item having said next upper level and a plurality of learning items falling within said predetermined number of lower levels.

11. The learning device according to claim 10,
wherein when one of said learning items displayed on said first visual information display means is designated by said second designation means, the range to be displayed on said first visual information display means is altered to cover a learning item having a highest level and a plurality of learning items falling within said predetermined number of lower levels immediately below said learning item having the highest level.

12. The learning device according to claim 10,
wherein the range of said tree structure displayed on said first visual information display means limitedly covers one learning item and a plurality of learning items having a next lower level, wherein when a learning item designated by said first designation means is followed by a plurality of learning items having a next lower level and being not displayed, the range to be displayed on said first visual information display means is altered to cover said learning item designated by said first designation means and said plurality of learning items having the next lower level, and wherein when a learning item having a level next upper than the level of said designated learning item exists and is not displayed, the range to be displayed on said first visual information display means is altered to cover said learning item having the next upper level and said designated learning items along with a plurality of learning items having the same level as the designated learning item.

13. The learning device according to claim 12,
wherein when one of said learning items displayed on said first visual information display means is designated by said second designation means, the range to be displayed on said first visual information display means is altered to cover a learning item having a highest level and a plurality of learning items immediately below said learning items having the highest level.

14. The learning device according to claim 10, wherein each of said learning materials has a single learning means which is used when said learning material is called.

15. The learning device according to claim 14, wherein said learning means comprises at least one of a data presentation means for presenting explanation, question, answer and a practical learning means for providing a practical learning environment.

16. The learning device according to claim 15, wherein said practical learning means comprises a CAD practical learning means.

17. The learning device according to claim 10, wherein each of said learning materials has a plurality of learning means having different explanation methods and styles, said learning device further comprising a called material name storage means for storing a learning material name read from said tree structure storage means by said learning material calling means, a list display instruction means for retrieving said learning means of a learning material having said learning material name and instructing said first visual information display means to display a name list of said learning means, and a calling means for calling, when one of the names of said learning means displayed is designated by said location designation means, a specific learning means corresponding to said one of the names of said learning means from a learning material having said learning material name stored in said called material name storage means.

18. The learning device according to claim 17, wherein each of said learning means comprises at least one of a data presentation means for presenting explanation, question, answer and a practical learning means for providing a practical learning environment.

19. The learning device according to claim 18, wherein said practical learning means comprises a CAD practical learning means.

* * * * *